W. J. GANO.
AUTOMOBILE TOP.
APPLICATION FILED AUG. 19, 1915.
1,195,801.
Patented Aug. 22, 1916.
2 SHEETS—SHEET 1.
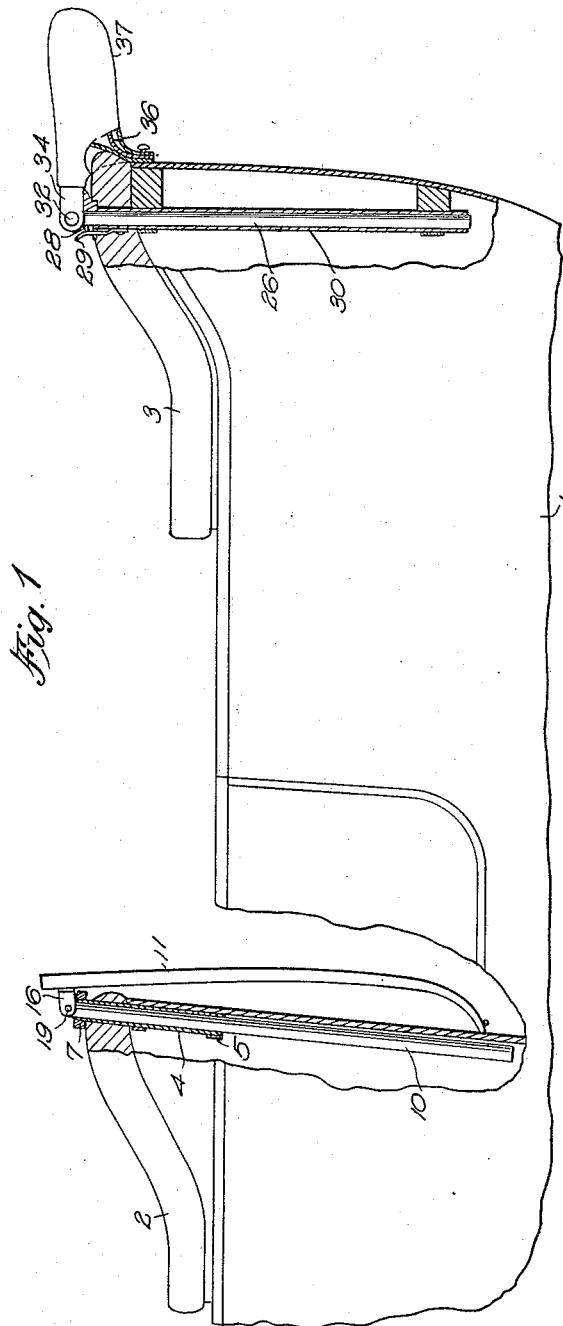
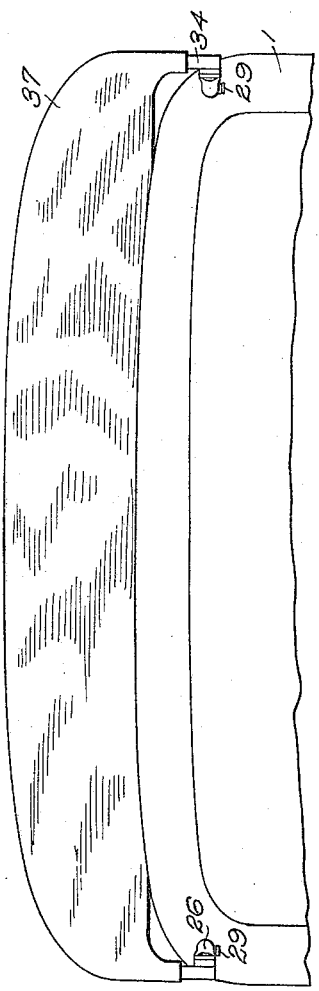
INVENTOR
Walter J. Gano

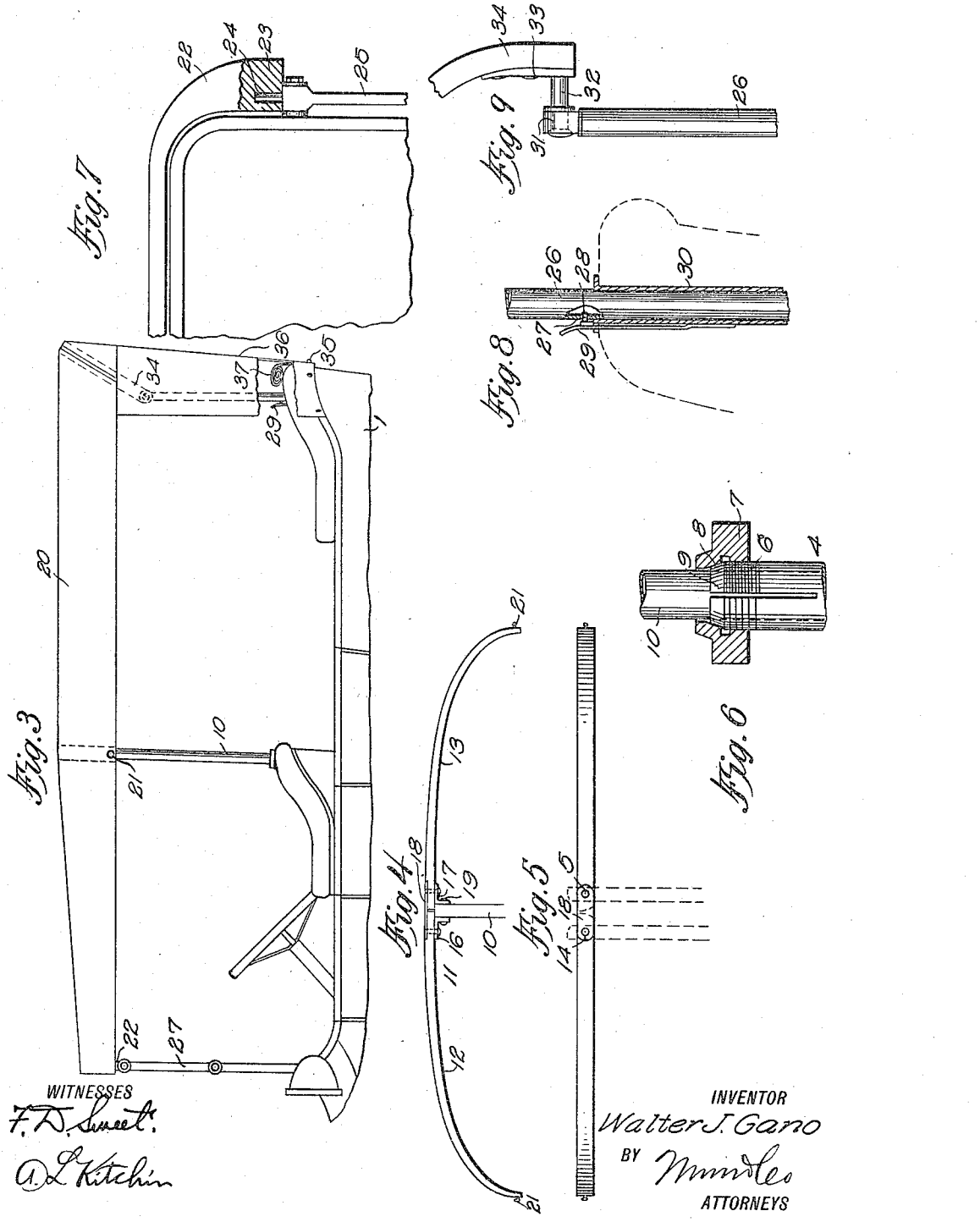

UNITED STATES PATENT OFFICE.

WALTER J. GANO, OF NEW ROCHELLE, NEW YORK.

AUTOMOBILE-TOP.

1,195,801.  Specification of Letters Patent.  Patented Aug. 22, 1916.

Application filed August 19, 1915. Serial No. 46,278.

*To all whom it may concern:*

Be it known that I, WALTER J. GANO, a citizen of the United States, and a resident of New Rochelle, in the county of Westchester and State of New York, have invented a new and Improved Automobile-Top, of which the following is a full, clear, and exact description.

This invention relates to automobile tops and has for an object the provision of an improved simple construction which may be readily applied and readily removed at any time.

Another object in view is to provide a top which may be adjusted and applied so as to occupy a very small space when not in use.

A still further object in view is to provide a top or a covering member with a plurality of supports which may be adjusted in such a manner as to be moved out of the way at the time the covering member is removed.

In the accompanying drawings:—Figure 1 is a partial side view of an automobile top with certain parts broken away and disclosing certain features of the invention; Fig. 2 is a top plan view of the rear of the construction shown in Fig. 1; Fig. 3 is a side view of part of an automobile body with a top embodying the invention applied thereto; Fig. 4 is a front view of a central support for the covering member shown in Fig. 3; Fig. 5 is a top view of the structure shown in Fig. 4; Fig. 6 is an enlarged fragmentary vertical sectional view through the locking means for the support shown in Figs. 4 and 5; Fig. 7 is a fragmentary front view of the front supporting member, certain parts being broken away; Fig. 8 is an enlarged fragmentary sectional view through the locking structure for the rear support of the top; Fig. 9 is an enlarged detail fragmentary front view of one end of the rear supporting arch and associated parts.

Referring to the accompanying drawings by numerals, 1 indicates an automobile body of any desired kind, provided with a front seat 2 and a rear seat 3. The construction of body 1 and seats 2 and 3 form no part of the present invention and for the purpose of illustration they are merely shown in a conventional manner. Connected with the back of the front seat 2 is a tubular member 4 which may be held to seat 2 by any suitable means, as for instance, straps or clips 5 of any desired kind, which straps or clips, if desired, may be held in place by screws or other means. The upper end of the tube 4 is split, as shown in Fig. 6, and is also provided with threads 6 for receiving nut 7. Nut 7 is provided with a conical-shaped portion 8 for engaging the beveled portion 9 on the upper end of tube 4, whereby when the nut is turned in one direction for screwing the same on to the threads 6 the cone 8 will collapse the upper end of the tube 4 and pinch the same against rod or tube 10.

The rod 10 acts as a standard for supporting the arch 11. Arch 11 (Figs. 4 and 5) is formed in parts 12 and 13 which are hinged at 14 and 15 to brackets 16 and 17 and also to a connecting strap 18 whereby the sections 12 and 13 may be hinged as shown in dotted lines in Fig. 5. After being hinged to this position the same may be hinged or swung at right angles thereto, as shown in Fig. 1, by reason of the fact that the brackets 16 and 17 are pivotally connected with rod 10 by means of a bolt or pin 19. When it is desired to move the arch 11 and supporting standard 10 from the position shown in Fig. 3, nut 7 is operated until the rod 10 becomes loose, whereupon the same will drop down by gravity to the position shown in Fig. 1, after which sections 12 and 13 may be hinged to the dotted position shown in Fig. 5 and then swung downwardly to the position shown in Fig. 1, thus completely moving the central support for the top 20 out of the way. It is of course evident that after the top 20 has been removed rod 10 and associated parts could also be removed completely from the machine. The sections 12 and 13 are each provided with a button 21 which is intended to be passed through suitable buttonholes in top 20 when the parts are in their operative position, as shown in Fig. 3.

In order to properly support and hold in position the front of the top 20 a front arch 22 is provided (Fig. 7) which is provided with enlarged ends 23 having apertures therein into which the projecting end or pin 24 of the shield support 25 projects. The top 20 may be secured to the front arch 22 in any suitable manner, as for instance, by being tacked thereto or buttoned thereto.

At the rear of the body 1 are supporting rods 26, there being one rod on each side. As these rods are identical in construction a description of one will apply to both. As shown in Fig. 8, rod 26 is provided with an opening 27 for receiving pin 28 whereby rod 26 is held elevated or in the position shown in Fig. 3. Pin 28 is secured to a spring member 29 rigidly connected to the tube 30 in any suitable manner and is intended to snap into aperture 27 as soon as the rod 26 is raised. Tube 30 is held secured to the automobile body 1 in any suitable manner and acts as a socket and guide for the rod 26 and also as a support when in a raised position. Each of the rods 26 is provided with a head 31 through which a pin 32 passes, said pin being formed integral with or rigidly secured to an extension or strap 33 which is secured to the rear arch 34. Pin 32 is pivotally mounted in head 31 so as to freely swing whenever desired. The top 20 extends over arch 22 as shown in Fig. 3, and is fastened thereto by tacks or other suitable means, and from said arch the top extends over the rear arch 34 and has connected thereto a back curtain 36 that has self-contained heavily reinforced straps of similar material as the cover, the back being provided with buttonholes at the ends to slip over suitable buttons 35 on back of the car, thus assisting in securing the proper tension of the top when raised. Any suitable side curtains may be used with or without wires and may be folded and held up by suitable straps inside of the rear arch when not in use.

Connected with the body 1 in any suitable manner, as for instance by tacks or buttons, is a cover or boot 37 which is normally rolled, as shown in Fig. 3, but which is adapted to inclose the top 20 when the same is removed, the boot 37 also inclosing arch 34 so as to make a nice, neat appearance for all the parts. Normally, when the top 20 is not in use the parts are arranged as shown in Fig. 1, and are arranged as shown in Fig. 3 when in use. However, all of the members may be quickly and easily removed from the body 1 at any time except the tubes 4 and 30. When all the parts are in the operative position except the central arch 11 the top 20 is supported but is not tight, and this arch is then raised and moved to the proper position, as shown in Fig. 3, so as to not only act as a support but as tensioning means for producing the proper tension on the top 20. It will be seen that this may easily be done by raising the rod 10 to a greater or less extent, as may be desired, and then locking the same by nut 7.

What I claim is:—

1. In an automobile top of the character described, a canopy, means for supporting the forward end thereof, means for supporting the rear end thereof, and a central support for the canopy, said central support acting as tensioning means, said central support comprising an arched member formed in parts, means for hinging said parts together, a member for hinging said parts on a standard whereby the parts may be swung together and then downwardly against said standard, a standard for supporting said arch, and an adjustable member for locking said standard in any desired vertical adjustment.

2. In an automobile top of the character described, a canopy, means for supporting the forward end thereof, means for supporting the rear end thereof, and a central support for said canopy, said central support comprising a standard, an arc-shaped member formed in parts, means for hinging said parts together, and a member for hinging said parts on said standard whereby the parts may be swung together and then downwardly against said standard.

In testimony whereof I have signed my name to this specification in the presence of two subscribing witnesses.

WALTER J. GANO.

Witnesses:
  GEORGE H. EMSLIE,
  A. H. DAVIS.

Copies of this patent may be obtained for five cents each, by addressing the "Commissioner of Patents, Washington, D. C."